(12) United States Patent
Valembois

(10) Patent No.: US 9,447,802 B2
(45) Date of Patent: Sep. 20, 2016

(54) MULTI-BRANCH FITTING MADE OF COMPOSITE MATERIAL AND METHOD OF MANUFACTURING SUCH A MULT-BRANCH FITTING

(75) Inventor: Guy Valembois, Lauzerville (FR)

(73) Assignee: SKF Aerospace France, Saint-Vallier (FR)

(*) Notice: Subject to any disclaimer, the term of this patent is extended or adjusted under 35 U.S.C. 154(b) by 569 days.

(21) Appl. No.: 13/980,106

(22) PCT Filed: Jan. 18, 2012

(86) PCT No.: PCT/FR2012/050108
§ 371 (c)(1),
(2), (4) Date: Jul. 17, 2013

(87) PCT Pub. No.: WO2012/098333
PCT Pub. Date: Jul. 26, 2012

(65) Prior Publication Data
US 2013/0287479 A1    Oct. 31, 2013

(30) Foreign Application Priority Data

Jan. 19, 2011 (FR) .................................. 11 50400

(51) Int. Cl.
| | | |
|---|---|---|
| *F16B 7/00* | (2006.01) | |
| *B29C 70/44* | (2006.01) | |
| *B29C 70/86* | (2006.01) | |
| *B29D 99/00* | (2010.01) | |
| *F16B 5/01* | (2006.01) | |
| *B29C 70/68* | (2006.01) | |
| *B29C 70/20* | (2006.01) | |
| *B29C 70/46* | (2006.01) | |

(52) U.S. Cl.
CPC ............ *F16B 7/00* (2013.01); *B29C 70/446* (2013.01); *B29C 70/68* (2013.01); *B29C 70/865* (2013.01); *B29D 99/0003* (2013.01); *F16B 5/01* (2013.01); *B29C 70/20* (2013.01); *B29C 70/462* (2013.01); *Y10T 403/341* (2015.01)

(58) Field of Classification Search
CPC ......... B64C 1/06; B64C 1/061; B64C 1/064; B64C 1/065; B64C 1/12; B64C 3/18; B64C 3/182; B64C 3/185; B64C 3/26
See application file for complete search history.

(56) References Cited

U.S. PATENT DOCUMENTS

| | | | | |
|---|---|---|---|---|
| 2,448,362 | A * | 8/1948 | Earhart | 280/495 |
| 4,113,910 | A * | 9/1978 | Loyd | 428/162 |
| 4,606,961 | A | 8/1986 | Munsen | |
| 6,849,150 | B1 * | 2/2005 | Schmidt | 156/285 |
| 2007/0175573 | A1 | 8/2007 | Fox et al. | |

FOREIGN PATENT DOCUMENTS

| | | | | |
|---|---|---|---|---|
| FR | 719 770 | * | 2/1932 | ............... B64C 1/06 |
| FR | 2940174 A1 | | 6/2010 | |
| WO | 2009 140555 A2 | | 11/2009 | |

* cited by examiner

*Primary Examiner* — Michael P Ferguson
(74) *Attorney, Agent, or Firm* — Andrew W. Chu; Craft Chu PLLC

(57) ABSTRACT

A multi-branch fitting includes at least three branches, molded from a composite material and, more precisely, from a fiber-reinforced thermoplastic or thermoset matrix. The fitting is intended for assembling components which are at an angle to one another. There are at least three flat or substantially flat branches or flanges extending radially from a joining zone, and at least one face or part of a face constituting a bearing face for one or more of the components that are to be attached. The joining zone has a cross section, in the transverse direction, in the shape of a polygon with concave sides. The connection of each of the branches or flanges with another adjacent branch or flange is achieved through a portion in the shape of a curved blade which gives the joining zone one of its concave shapes.

7 Claims, 2 Drawing Sheets

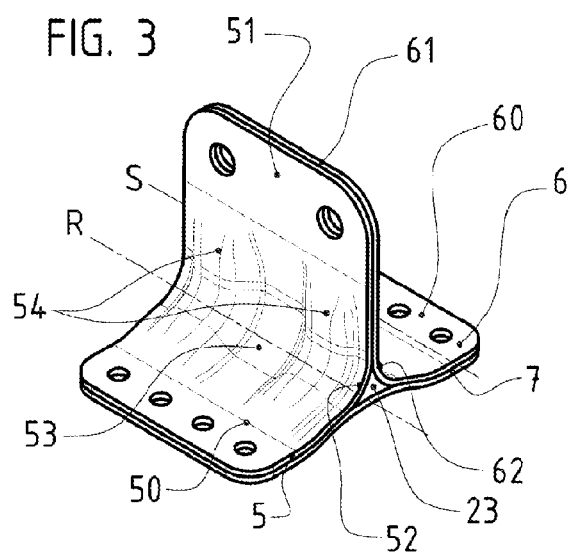
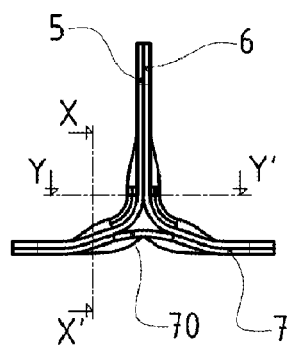
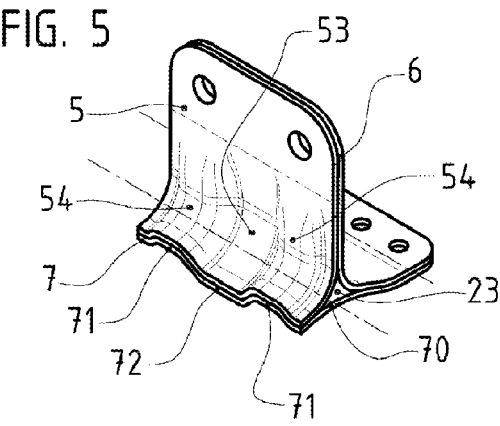
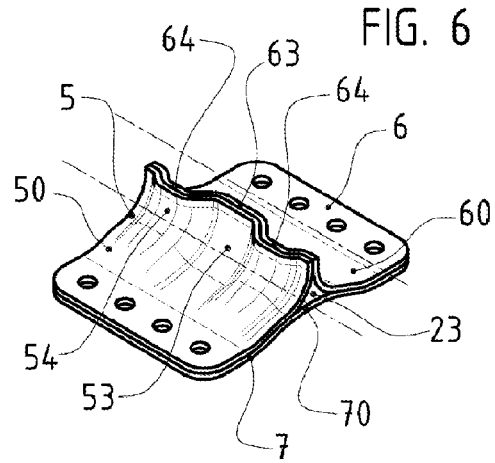
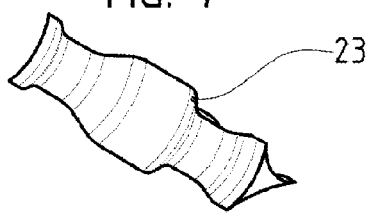

MULTI-BRANCH FITTING MADE OF COMPOSITE MATERIAL AND METHOD OF MANUFACTURING SUCH A MULT-BRANCH FITTING

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates, in the field of the composite materials, to a multi-branch fitting, comprising at least three branches aimed at assembling parts forming an angle between them, as well as to a method for manufacturing such a multi-branch fitting.

Under multi-branch fitting, it is understood that a fitting comprises at least three flat or substantially flat branches or flanges extending radially from a joining area. The branches or flanges of these multi-branch fittings may not necessarily all be intersecting according to one and the same axis, and extend according to planes intersecting externally to the fitting. The most often used multi-branch fittings are particular cases such as T-, Y- or X-shaped fittings.

A multi-branch fitting made of composite material is essentially, but not restrictively, aimed at being used in the field of aeronautics, for example to connect two or more parts, and as a replacement for similar fittings hitherto made of metal. These fittings are aimed at being made integral with the parts to be connected and therefore provided, externally to the folding, with coupling areas aimed at permitting the assembling of said parts to be connected, in association with means for making integral, which may consist, non-restrictively, of gluing, riveting or screwing means.

2. Description of Related Art Including Information Disclosed Under 37 CFR 1.97 and 37 CFR 1.98

By way of an example, a multi-branch fitting of the state of the technique, in this case a T-shaped fitting, is shown in FIG. 1. This T-shaped fitting 1 includes a sole 10, in the form of a plate, and a transverse wall 11, which extends on one side 12 of said sole 10 while forming with the latter an angle, in this case a right angle, and which divides said sole into two parts 13 and 14, in this case having the same dimensions, the side of said sole opposite the one from which extends said transverse wall constituting a bearing face 15 aimed at entering into contact with one of the parts to be fixed, while either one of the two faces 16 and 17 of said transverse wall 11 constitutes a bearing face for one or several other parts to be fixed. This T-shaped fitting 1 includes a multiplicity of holes 18 aimed at permitting to fix the parts to be assembled, through joining means such as screws or rivets. Such a T-shaped fitting 1 is achieved by molding a composite material, more specifically from a fiber-reinforced thermoplastic or thermosetting matrix.

The replacement of the metallic elements by elements made of composite material is essentially imposed by the necessity of a weight gain. This has however drawbacks from the point of view of the strength.

It is indeed known that the weak point of the composite materials is the matrix, which has a much lower specific strength than the fibers. The range is for example of 20 MPa for resin and of 4000 Mpa for carbon fiber. Therefore, the collapsing of a part made of composite material is generally due to a breaking of the resin connecting the fibers, and in the case of a T-shaped fitting made of composite material the breaking is observed during a work essentially of unfolding and folding the transverse wall relative to the sole.

In order to cope with this drawback, it would be appropriate that the reinforcing fibers are subjected to the tensile and/or compression forces, and that the resin is not or little stressed. It is however not possible with the presently known techniques to achieve an optimal orientation of the fibers in such a part, except at a very high cost.

From WO2010072952 is known an L-shaped fitting, made by molding a composite material, which comprises two portions forming an angle between them and drilled with holes in order to permit to make both portions integral by fastening means, at least one of said two portions having, on the inner side of said fitting, a concave curved profile, and more particularly a spherical or cylindrical profile, the hole or holes provided in same having an axis radial to the curvature.

This configuration permits the reinforcing fibers, or part of them, to be oriented in the direction of traction and/or compression, so that they are stressed by priority with respect to the resin.

However, such an L-shaped fitting cannot substitute a multi-branch fitting for assembling parts forming an angle between them; it does not have the required rigidity both for folding and unfolding. In order to replace for example a T-shaped fitting, two of these L-shaped fittings should then be used, as preconized in said WO2010072952, with the drawback of an uneasy implementation and an obvious failure of unicity of the part, resulting into an additional weight.

SUMMARY OF THE INVENTION

The present invention is aimed at providing a multi-branch fitting made of composite material aimed at connecting parts forming an angle between them and permitting to solve the various above-mentioned drawbacks, as well as the method for manufacturing such a multi-branch fitting.

The multi-branch fitting, comprising at least three branches, made by molding a composite material, and more specifically a fiber-reinforced thermoplastic or thermosetting matrix, aimed at assembling parts forming an angle between them, according to the invention, comprising at least three flat or substantially flat branches or flanges extending radially from a joining area, and at least one face or face portion of which is shaped so as to constitute a bearing face for one or several of said parts to be fixed, is characterized in that, on the one hand, said joining area has a cross-section, in the transverse direction, i.e. perpendicular to at least one of said branches or flanges, having the form of a polygon with concave sides and, on the other, in that the connection of each one of said branches or flanges to another adjacent branch or flange, is made through a portion having the form of a curved blade that provides said joining area with its concave shapes.

According to an additional feature of the multi-branch fitting of the invention, the joining area has, in addition to its concave profile at the level of the joining of two adjacent branches or flanges, a succession, in its longitudinal direction, of domed or hollow portions.

According to another additional feature of the multi-branch fitting of the invention, the flanges or branches include, at the level of their portions forming bearing faces, holes for the passing through of joining means.

According to a particular embodiment of the multi-branch fitting according to the invention, it has a T-shaped profile and thus includes a sole being in the form of a plate, and a transverse wall, which extends on one side of said sole, forming an angle with the latter and which divides said sole into two portions, the side of said sole, opposite the one on which said transverse wall extends, constituting entirely or partially a bearing face aimed at entering into contact with one of said parts to be fixed, while either one of both faces of said transverse wall constitutes entirely or partially a bearing face for one or several other ones of said parts to be fixed, said sole and said transverse wall being designed capable of cooperating with means for making integral the joining area of said transverse wall with that of said sole having a traverse cross-section, in the direction perpendicular to the plane of said transverse wall, in the form of a triangle with concave sides, while the connection of said transverse wall to each of said two portions is made through a portion in the form of a curved blade.

The method for manufacturing a multi-branch fitting made of composite material, as defined above, is essentially characterized in that it consists in:

assembling as many parts to each other as there are branches or flanges, each of said parts being a part aimed at constituting a portion, in the direction of the thickness, of a branch or flange, and a portion, in the direction of the thickness, of an adjacent branch or flange and, on the other hand, folded according to a radius of curvature in order to form an angle said adjacent branches or flanges must form between them, arranging in the joining area, into contact with said parts, a core, whether durable or not, perfectly matching the shapes of said parts, and finally arranging the assembly obtained in a mold and applying particular pressure and/or temperature conditions, so as to carry out the polymerization of said composite material.

According to an additional feature of the inventive method, it comprises previously the following operations:

preparing layers of composite material each formed of a matrix, in which one-directionally arranged fibers are embedded, in order to create the parts to be assembled, and shaping said layers through curved folding, concentrically to an axis perpendicular to the orientation of said fibers.

According to another additional feature of the inventive method, it comprises in addition, during the shaping of the layers of composite material, the following operations:

making, in the folding area, for each part, in the longitudinal direction of the folding axis, a succession of hollow or domed portions, which are arranged symmetrically with respect to those created in the folding area of the adjacent parts, so as to permit an encasing during the nearing back-to-back to each other of said parts.

According to a particular embodiment of the inventive method, it consists, for manufacturing a T-shaped multi-branch fitting, in:

assembling three parts, namely two L-shaped parts, the folding area of which is curved, assembled so that one branch or flange of one of them is into contact with a branch or flange of the other one, and so that the other two branches or flanges are in the extension of each other, and a globally flat third part arranged in contact with said two branches or flanges in the extension of each other, and having, in front of the joining area of said two branches or flanges, a portion domed towards said joining area.

According to an additional feature of the particular embodiment of the inventive method, it comprises previously the following operations:

shaping of a first layer of composite material formed of a matrix, in which one-directionally arranged fibers are embedded, in order to create the first L-shaped part, the curved folding area of which is concentric to an axis perpendicular to the orientation of said fibers, and which has, in the longitudinal direction of said axis, a succession of hollow or domed portions, shaping of a second layer of composite material formed of a matrix, in which one-directionally arranged fibers are embedded, in order to create the second L-shaped part, the curved folding area of which is concentric to an axis perpendicular to the orientation of said fibers, and which has, in the longitudinal direction of said axis, a succession of hollow or domed portions, which are arranged symmetrically with respect to those created in said first layer, so as to permit an encasing during the nearing back-to-back to each other of said L-shaped parts, and shaping of a third layer of composite material formed of a matrix, in which one-directionally arranged fibers are embedded, in order to create the third globally flat part, which has in its median region a domed transverse area, along which is provided a succession of hollow and domed portions capable of closely cooperating in encasement with the hollow and domed portions the portions of said L-shaped parts include, which said third part is aimed at entering into contact with.

It should be noted that the manufacturing method can have numerous variants, namely depending on the molding techniques being used.

Thus, for example in the case of using a molding method by injection of resin on a preformed mat, of the RTM (Resin Transfer Molding) type, it is possible to use this technique either for making the parts to be assembled in substitution of the shaping of layers or for molding the part integrally by injection of resin, while the mold incorporates the preformed mat and the core that guarantees the positioning of the reinforcing fibers.

The advantages and features of the multi-branch fitting and the manufacturing method according to the invention will become clear from the following description, which refers to the attached drawing, which represents a non-restrictive embodiment of same.

BRIEF DESCRIPTION OF THE DRAWINGS

FIG. 3 represents a schematic perspective view of the same T-shaped fitting during its manufacture.

FIG. 4 represents a schematic side elevation view of the same T-shaped fitting during its manufacture.

FIG. 5 represents a schematic perspective and cross-sectional view according to the axis XX' of FIG. 4.

FIG. 6 represents a schematic perspective and cross-sectional view according to plane YY' of FIG. 4.

FIG. 7 represents a schematic perspective view of a portion of the same T-shaped fitting according to the invention.

DETAILED DESCRIPTION OF THE DRAWINGS

For the sake of simplification, the following description refers only to a T-shaped multi-branch fitting, knowing that other configurations are possible.

Figure 1:
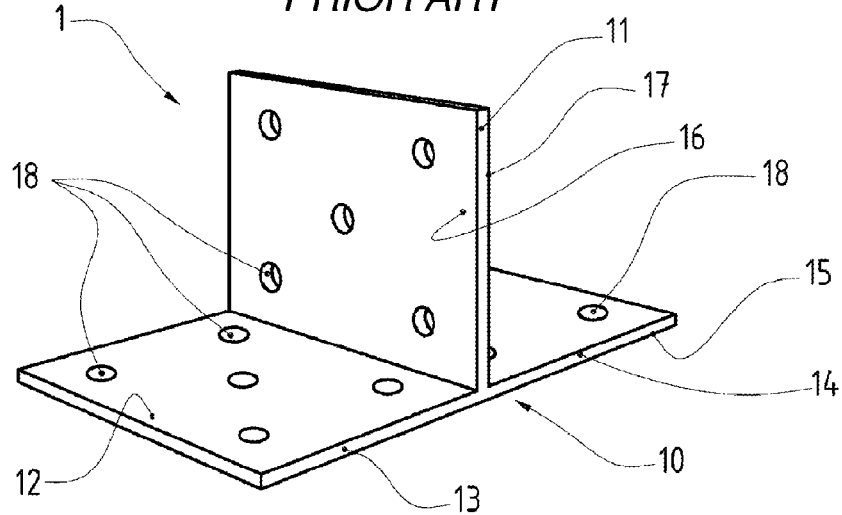
FIG. 1 represents a schematic perspective view of a T-shaped fitting of the state of the art.
Figure 2:
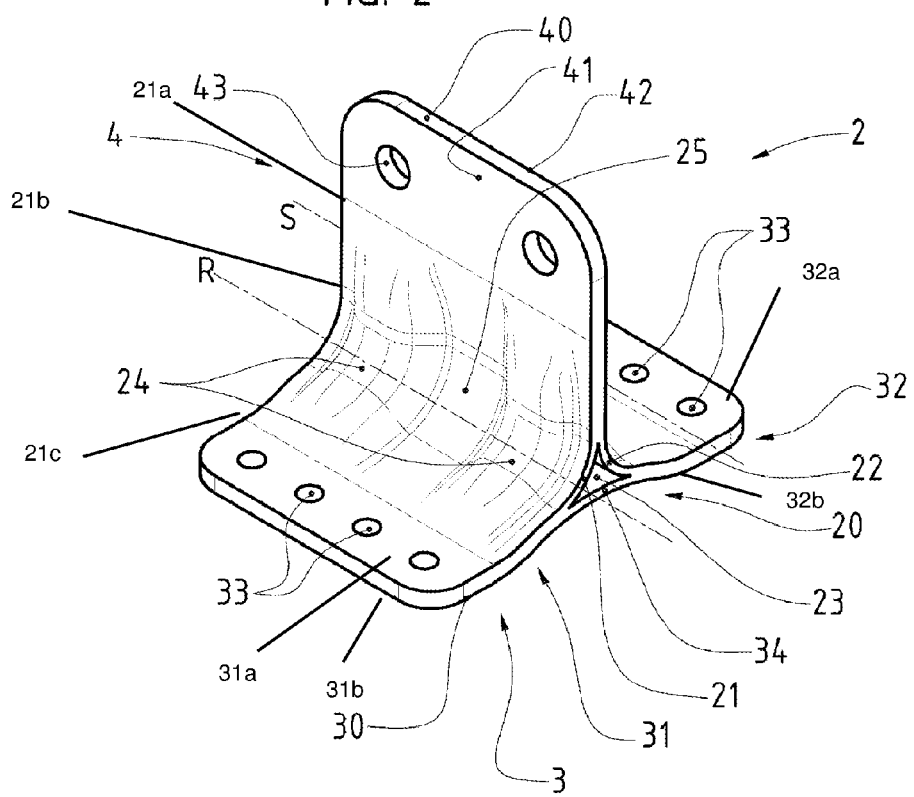
FIG. 2 represents a schematic perspective view of a T-shaped fitting according to the invention.

When referring to FIG. 2, one can see a T-shaped fitting 2 according to the invention, which comprises a sole 3 topped by a transverse wall 4.

The sole 3 has a globally flat shape, the side opposite the one, from which the transverse wall 4 extends, constitutes a bearing face 30 aimed at entering into contact with one of the parts, not shown, to be assembled.

The transverse wall 4 extends perpendicularly to the sole 3, and divides the latter into two portions 31 and 32 having the same dimensions. The wall or branch 4 has face portions 41 and 42. Similarly, the two portions or branches 31 and 32 can have face portions 31 a, 31 b and 32a, 32b.

It should be noted that this architecture constitutes a particular embodiment, and that it is perfectly possible that the transverse wall 4 forms with the sole 3 an angle other than a right angle, and/or that this transverse wall 4 divides the sole 3 into two portions having different dimensions.

Likewise, the sole 3 can have a folding, for example in front of the wall 4, so as to obtain a Y-shaped multi-branch fitting, while another transverse wall can extend from the bearing face 30 of the sole 3, in order to obtain an X-shaped multi-branch fitting.

The transverse wall 4 has a free extreme portion 40, both sides 41 and 42 of which are flat, so as to be able to constitute contact faces with one or several parts to be assembled.

The joining of the T-shaped fitting 2 and the parts to be assembled can occur in different ways, non-restrictively through gluing, screwing or riveting, in this case the sole 3 and the transverse wall 4 include holes 33 and 43, respectively, permitting the passing through of screws or rivets, not shown.

The transverse wall 4 is made integral with the sole 3 through a joining area 20, which has a triangle-shaped transverse cross-section, in the direction perpendicular to the plane of the transverse wall 4, the three sides of which are concave. Thus, the connection between the wall 4 and the portion 31 of the sole 3 is made by means of a concave curved blade 21 globally concentric to an axis R, while the connection between the wall 4 and the portion 32 of the sole 3 is made by means of a concave curved blade 22 globally concentric to an axis S, and the face 30 of the sole 3 has, in front of the transverse wall 4, a concave recess 34. Each curved blade portion 21 has a first connecting edge 21a attached to one branch 4, a second connecting edge 21b attached to one adjacent branch 31, and a folded spine portion 21c.

One should note the presence between the blades 21 and 22 and the sole 3, of a core 23, which, as will be seen below, is indispensable only for the manufacture.

The concave shape of the blade 21 participates to the strength during the unfolding of the transverse wall 4 with respect to the portion 31 of the sole 3 and, hence, during the folding of the wall 4 onto the portion 32 of the sole 3, while the blade lame 22 participates to the strength during the unfolding of the transverse wall 4 with respect to the portion 32 and, hence, during the folding of the wall 4 onto the portion 31.

It should be noted that the concave recess 34 of the sole 3 helps increasing the strength during the folding and the unfolding.

This strength during the folding and the unfolding is increased by the presence of undulations resulting from deformations formed, at the level of the joining area 20, of a succession, in the longitudinal direction of the joining area 20, of alternated domed 24 and hollow 25 portions.

These domed and hollow portions are essentially created at the level of the blades 21 and 22, and symmetrically to each other, as will be seen below.

When referring now to FIGS. 3, 4, 5 and 6, one can see the same T-shaped fitting 2, before the polymerization phase permitting to obtain the T-shaped fitting 2 as shown in FIG. 2.

In FIG. 3 can be seen that the T-shaped fitting 2 results from the previous assembling of three parts, namely two L-shaped parts 5 and 6, and one globally flat part 7.

The L-shaped part 5 includes two flanges 50 and 51 connected by a curved folding area 52 concentric to the axis R, while the L-shaped part 6 includes two flanges 60 and 61 connected by a curved folding area 62 concentric to the axis S.

Both L-shaped parts 5 and 6 each result from the shaping of a layer of composite material formed of a matrix, in which fibers are embedded arranged one-directionally in the direction perpendicular to the line of folding, so that these fibers are wound concentrically to the axes R and S, respectively.

As can be seen in FIGS. 5 and 6, the L-shaped parts 5 and 6 also include, essentially at the level of the folding area 52 and 62, deformations, namely for the L-shaped part 5, a median pit 53 edged by two bosses 54, and for the L-shaped part 6, a median boss 63 edged by two pits 64.

The two L-shaped parts are assembled back-to-back, i.e. the flanges 51 and 61 are placed against each other, while the flanges 50 and 60 are in the extension of each other, with a perfect matching of the median pit 53 with the median boss 63, and of the pit 64 with the bosses 54.

The globally flat part 7 completes the assembly by being applied against the flanges 50 and 60. This part 7 also results from the shaping of a layer of composite material formed of a matrix, in which fibers arranged one-directionally in the direction parallel to that of the fibers of the parts 50 and 60 are embedded.

The part 7 has in its median region a domed transverse area 70, aimed at being placed, during the assembling, in front of the joining of the L-shaped parts 5 and 6. This domed transverse part 70 includes in addition deformations, namely pits 71 and bosses 72, visible in FIG. 5, aimed at cooperating en encasement with the pits 53 and 64, and the bosses 54 and 63 of the flanges 50 and 60.

It will be understood that the assembling of the flanges 51 and 61 is aimed at constituting, after molding, the transverse wall 4 of the T-shaped fitting 2, while the assembling of the flanges 50 and 60 with the part 7 is aimed at constituting the sole 3, and that the folding areas 52 and 62 are aimed at constituting the blades 21 and 22, respectively.

It should be noted that the assembling is complemented by previously placing a core 23, represented in FIG. 7, which is designed capable of closely encasing between the parts 5, 6 and 7, so that the latter preserve, during the molding operation until the polymerization, their initial shapes, and especially so as to guarantee the optimized radius of curvature of the folding areas 52 and 62 and, hence, of the reinforcing fibers they contain.

The core 23 is indispensable for the molding operation, it thus permits that no sagging of the parts 5 and 6 onto the part 7 occurs at the level of the folding areas. On the other hand, it is not indispensable for using the T-shaped fitting 2, it can therefore consists, non-restrictively, of an inflatable bladder, of a part of elastomer removable after molding, or of a part made of fusible material.

The T-shaped fitting 2 permits to optimize the use of the reinforcing fibers the layers of composite material being used contain. Because of the concave curved shape of the blades 21 and 22, shape that the fibers follow, the forces during the unfolding are borne almost to a large extent by these fibers.

The deformations 53, 54, 63 and 64 permit to create the domed 24 and hollow 25 portions and, hence to increase the strength of the T-shaped fitting 2, while preserving a constant thickness of the walls of the T-shaped fitting 2 and, hence, without increasing its weight.

What is claimed:

1. A multi-branch fitting formed by molding layers of a composite material, the fitting comprising:
   a plurality of at least three flanged fitting parts, each fitting part formed by folding a layer of composite material and comprising a pair of substantially planar flanges connected at an angle along respective longitudinal edges thereof by a curved folded spine portion, each respective flange being joined to a flange of another one of the plurality of fitting parts;
   wherein corresponding flanges of adjacent fitting parts are joined back-to-back against each other to form a plurality of at least three branches radially extending from an enclosed joining area comprising concave sides defined by the curved spine portions of the fitting parts, each branch being generally flat and having a first face portion defined by a first respective flange and an opposing second face portion defined by a second respective flange, each face portion comprising a plurality of holes extending therethrough for receiving attachment fasteners, each branch forming a branch angle with an adjacent branch;
   wherein a fold angle between the flanges of each fitting part corresponds to a respective branch angle between adjacent branches;
   wherein the folded spine portion of each fitting part comprises undulations extending along a longitudinal direction of the spine portion, the undulations defined by at least a first domed portion and a first hollow portion, each domed portion being convex facing outward toward respective branches and outward from a longitudinal axis of the joining area, and each hollow portion being concave facing away from respective branches and inward toward the longitudinal axis of the joining area; and
   wherein corresponding flanges of adjacent fitting parts are assembled back-to-back against each other such that each hollow portion of a first respective fitting part is matingly received within a corresponding domed portion of a second respective fitting part.

2. The multi-branch fitting according to claim 1, wherein each folded spine portion comprises at least two domed portions aligned along the folded spine portion with a respective hollow portion disposed between each pair of adjacent domed portions.

3. The multi-branch fitting according to claim 1, wherein the branch angle between two adjacent branches is generally 180 degrees so as to form a plane, and wherein the branch angle between a respective third branch and each of the two adjacent branches is generally 90 degrees, said respective third branch being transverse to said plane, said joining area having a T-shaped cross-section.

4. A method for manufacturing a multi-branch fitting according to claim 1, the method comprising the steps of:
   folding a respective layer of composite material to form each of the plurality of fitting parts, using a core disposed between layers of composite material forming the fitting parts to form said respective curved folded spine portions;
   setting the layers of composite material defining the fitting parts in a mold; and
   polymerizing the fitting parts under pressure and at temperatures to set the composite material.

5. The method for manufacturing according to claim 4, wherein the step of folding a respective layer of composite material to form each of the fitting parts, further comprises:
   arranging fibers in one direction;
   embedding the fibers in a matrix so as to form a layer of composite material; and
   folding said layer of composite material concentrically around axes perpendicular to said one direction of fibers so as to form each fitting part.

6. The method for manufacturing according to claim 4, wherein the branch angle between two adjacent branches is generally 180 degrees so as to form a plane, and wherein the branch angle between a respective third branch and each of the two adjacent branches is generally 90 degrees, said respective third branch being transverse to said plane, said joining area having a T-shaped cross-section;
   wherein two fitting parts are L-shaped;
   wherein one fitting part is flat; and
   wherein said third branch is formed by said two fitting parts being L-shaped.

7. The method for manufacturing according to claim 4, wherein the step of folding a respective layer of composite material to form each of the fitting parts, further comprises:
   arranging fibers in one direction;
   embedding the fibers in a matrix so as to form a layer of composite material;
   folding said layer of composite material concentrically around axes perpendicular to said one direction of fibers so as to form each fitting part;
   folding a respective folding area of said layer of composite material over a respective domed folding portion of a core so as to form said domed portion; and
   folding said respective folding area of said layer of composite material over a respective hollow folding portion of a core so as to form said hollow portion.

* * * * *